United States Patent
Kimishima et al.

[11] Patent Number: 5,983,989
[45] Date of Patent: Nov. 16, 1999

[54] METHOD AND APPARATUS FOR CONTROLLING DISCHARGED-AIR TEMPERATURE FOR VEHICULAR AIR-CONDITIONING SYSTEM

[75] Inventors: Masahiro Kimishima; Kouji Nawata, both of Tochigi-ken, Japan

[73] Assignee: Honda Giken Kogyo Kabushiki Kaisha, Tokyo, Japan

[21] Appl. No.: 09/069,841

[22] Filed: Apr. 30, 1998

[30] Foreign Application Priority Data

Apr. 30, 1997 [JP] Japan ................................ 9-112070

[51] Int. Cl.$^6$ ............................ F25B 29/00; B60H 1/00
[52] U.S. Cl. .......................... 165/43; 165/42; 165/43; 165/228; 165/255; 62/173; 237/12.3 C; 236/91 C; 236/91 D; 236/91 F
[58] Field of Search ............................. 165/204, 42, 43, 165/228, 255; 237/12.3 C; 236/91 F, 91 D, 91 C; 62/173

[56] References Cited

U.S. PATENT DOCUMENTS

| | | | |
|---|---|---|---|
| 4,562,954 | 1/1986 | Kajita | 236/91 D |
| 4,966,011 | 10/1990 | Iida | 236/91 F |
| 5,209,079 | 5/1993 | Kajino | 236/91 C |
| 5,244,035 | 9/1993 | Iida et al. | 165/43 |
| 5,293,928 | 3/1994 | Iida et al. | 165/43 |
| 5,392,845 | 2/1995 | Honda et al. | 165/42 |
| 5,564,493 | 10/1996 | Kato et al. | 236/91 F |
| 5,626,186 | 5/1997 | Honda et al. | 165/43 |
| 5,653,385 | 8/1997 | Honda et al. | 165/204 |
| 5,676,204 | 10/1997 | Samukawa et al. | 236/91 C |
| 5,810,078 | 9/1998 | Knutsson et al. | 165/43 |

Primary Examiner—John K. Ford

[57] ABSTRACT

Disclosed is a system for controlling discharged-air temperature for a vehicular air-conditioning system, comprising a duct, a cooling medium circuit, a heating medium circuit, an air-mixing unit, and an automatic air-conditioning ECU. The automatic air-conditioning ECU performs air-mixing control for cold air and hot air by means of the air-mixing unit to adjust the temperature of air discharged from a face outlet into a passenger's compartment only when an estimated discharged-air temperature in an operation mode is not lower than a reference temperature setting.

7 Claims, 9 Drawing Sheets

F I G. 9
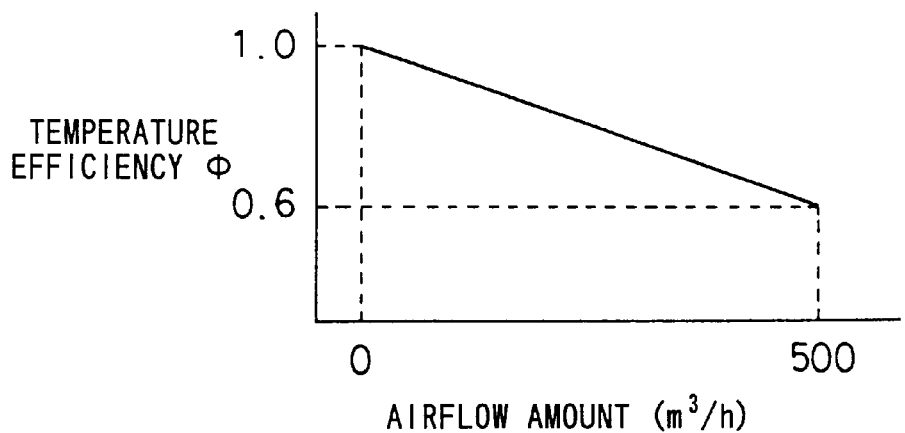
F I G. 10
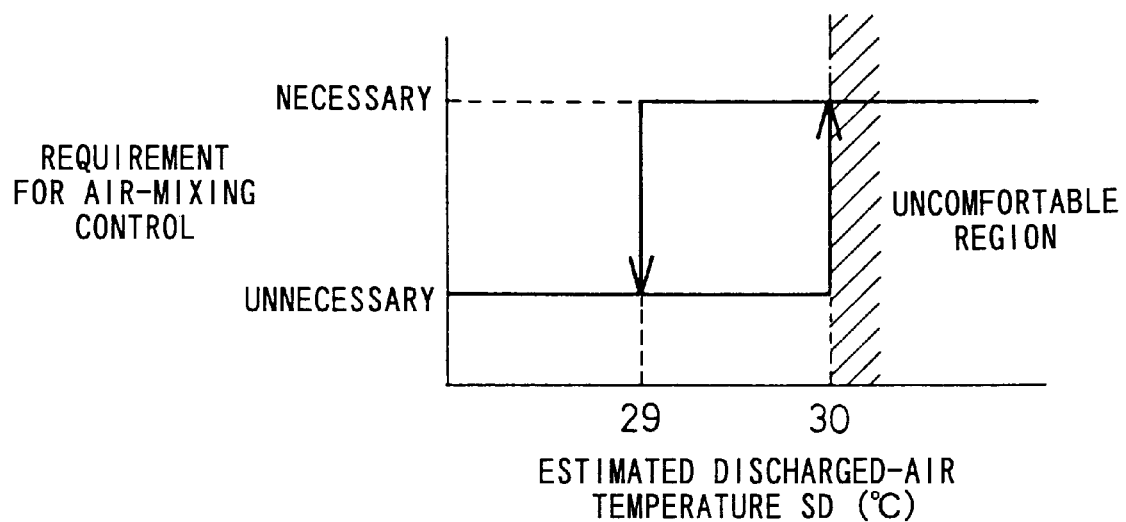

METHOD AND APPARATUS FOR CONTROLLING DISCHARGED-AIR TEMPERATURE FOR VEHICULAR AIR-CONDITIONING SYSTEM

BACKGROUND OF THE INVENTION

1. Field of the Invention

The present invention relates to a method and an apparatus for controlling discharged-air temperature for a vehicular air-conditioning system including an upper outlet disposed at an upper position for discharging air into a passenger's compartment and a lower outlet disposed at a lower position for discharging air into the passenger's compartment.

2. Description of the Related Art

In general, a variety of systems are adopted in order to perform air-conditioning in a passenger's compartment of a vehicle. Those widely used include, for example, a reheat system in which all of cold air, which has been dehumidified after passing through an evaporator, is allowed to pass through a heater core to heat the cold air so that the temperature-controlled and/or humidity-controlled air is discharged from respective outlets into the passenger's compartment, and an air-mixing system in which air, which has passed through an evaporator, is divided by an air-mixing damper into air to make a passage through a heater core and air to make a detour to avoid the heater core, followed by mixing hot air and cold air at a position downstream of the heater core to obtain mixed air which is discharged from respective outlets into the passenger's compartment.

The outlet mode of the vehicular air-conditioning system for discharging air into the passenger's compartment includes a "DEF" (defrosting) mode, a "FOOT/DEF" mode, a "FOOT" mode, a "B/L" (bi-level) mode, and a "VENT" mode (or "FACE" mode).

In the case of such a vehicular air-conditioning system, it is required to heat the passenger's compartment such that the passenger feels no burning sensation at face or head while maintaining a heating sensation at foot of the passenger. For this purpose, for example, the air-mixing control is performed, in which a predetermined temperature difference is given between temperatures of airs discharged from upper and lower outlets, i.e., airs discharged from the face outlet and the foot outlet during the "FOOT/DEF" mode and the "B/L" mode.

However, in the case of a heat pump air-conditioning system provided with a heat pump-type cooling cycle arranged with a condenser for heating the passenger's compartment by condensing a coolant in a duct to radiate heat, it is impossible to give the temperature difference between the discharged-air temperature at the face outlet and the discharged-air temperature at the foot outlet. Therefore, it is conceived for the heat pump air-conditioning system to combine the reheat type temperature control and the air-mixing type temperature control. As for such a combination, for example, a vehicular air-conditioning system is known as disclosed in Japanese Laid-Open Patent Publication No. 8-67134.

An object of the conventional air-conditioning system is to avoid excessive increase in motive power and excessive increase in electric power consumption of an electric compressor used for the heat pump air-conditioning system. In order to achieve the object, the conventional air-conditioning system comprises a discharged-air temperature control unit based on the use of both of the reheat type temperature control effected by controlling a compressor and the air-mixing type temperature control effected by controlling an air-mixing damper, for controlling the temperature of air discharged from the face outlet and the foot outlet. The discharged-air temperature control unit performs the air-mixing type temperature control only when the electric power consumed by the compressor is not more than a reference electric power. The discharged-air temperature control unit performs the air-mixing type temperature control only when the calculated target discharged-air temperature is not higher than a reference temperature, for example, 70° C.

However, in the case of the conventional air-conditioning system, the air-mixing type temperature control is not performed when the target discharged-air temperature is higher than the reference discharged-air temperature. Therefore, it is feared that high temperature air is discharged especially from the face outlet.

Further, the conventional air-conditioning system performs the air-mixing type temperature control in order to give the difference in temperature between the upper and lower outlets. When the outlet mode is the "VENT" mode, the ordinary reheat type temperature control is performed. Therefore, the following problem is pointed out. That is, when the operation mode is changed during the heating operation from the "HEAT" mode to the "VENT" mode, then air at a considerably high temperature is discharged against the face of the passenger, and the passenger feels an uncomfortable sensation. Especially, when it is intended to suddenly lower the discharged-air temperature, it is feared that air at a high temperature may be discharged from the face outlet against the face of the passenger.

SUMMARY OF THE INVENTION

A principal object of the present invention is to provide a method and an apparatus for controlling discharged-air temperature for a vehicular air-conditioning system, which makes it possible to effectively avoid hot air at a temperature not lower than a predetermined temperature, which would be otherwise discharged from an upper outlet into a passenger's compartment, and reliably avoid any uncomfortable sensation which would be otherwise given to a passenger due to the discharged high temperature air.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 9 is a map referred to when the target water temperature is computed;

FIG. 10 is a map referred to when it is determined whether the air-mixing control is necessary or unnecessary;

DESCRIPTION OF THE PREFERRED EMBODIMENTS

Figure 1:
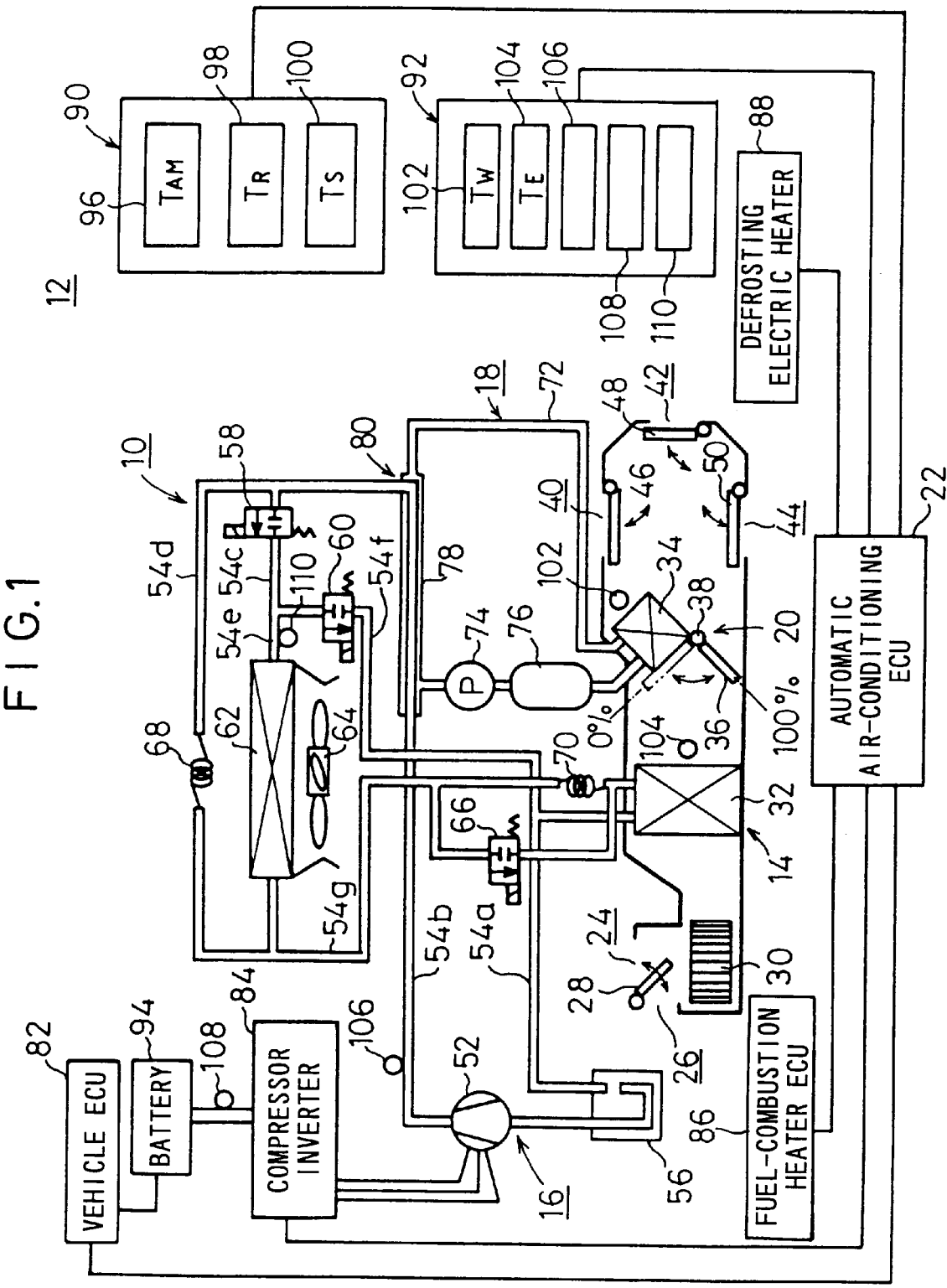
FIG. 1 is a schematic view, partly in block form, of an automatic air-conditioning system for use on an electric vehicle, into which a discharged-air control apparatus for a vehicular air-conditioning system according to the present invention is incorporated.

FIG. 1 schematically shows, partly in block form, an automatic air-conditioning system 12 for use on an electric vehicle, to which a discharged-air temperature control apparatus 10 according to the present invention is applied.

As shown in FIG. 1, the discharged-air temperature control apparatus 10 has a duct 14 for discharging temperature-controlled and humidity-controlled air into the passenger's compartment of the electric vehicle, a cooling medium circuit 16 for cooling the air flowing through the duct 14 through heat exchange between the air and a coolant, a heating medium circuit 18 for heating the air flowing through the duct 14 through heat exchange between the air and hot water (heating medium), an air-mixing unit 20 disposed in the duct 14 for mixing and controlling cool air and hot air, and an automatic air-conditioning ECU 22 for controlling operation of various units including the air-mixing unit 20.

The duct 14 is disposed in front of the passenger's compartment with an instrumental panel (not shown) interposed therebetween. The duct 14 has on its upstream end an interior air inlet 24 for introducing air from an interior space in the passenger's compartment and an exterior air inlet 26 for introducing from an exterior space outside of the passenger's compartment, the interior air inlet 24 and the exterior air inlet 26 being selectively openable and closable by a switching damper 28.

In the duct 14, there are disposed an air blower 30 closely to the switching damper 28 and an evaporator (first interior heat exchanger) 32 positioned downstream of the air blower 30, the evaporator 32 being part of the cooling medium circuit 16. The duct 14 also houses therein a heater core (second interior heat exchanger) 34 disposed downstream of the evaporator 32, the heater core 34 being part of the heating medium circuit 18. The air-mixing unit 20 is mounted on an inlet side of the heater core 34. The air-mixing unit 20 has an air-mixing damper 36 which can be angularly moved to any desired angular position within an angular range from an angular extent 0% to an angular extent 100% by an air-mixing motor 38 coupled to the air-mixing damper 36.

The duct 14 has in its downstream end portion a defrosting outlet 40 for discharging air against the inner surface of a front windshield of the electric vehicle, a face outlet (upper outlet) 42 for discharging air against the head of a passenger in the passenger's compartment, and a foot outlet (lower outlet) 44 for discharging air against the feet of the passenger. The defrosting outlet 40, the face outlet 42, and the foot outlet 44 are associated respectively with a defrosting damper 46, a face damper 48, and a foot damper 50 which are angularly movable to open and close the defrosting outlet 40, the face outlet 42, and the foot outlet 44, respectively.

These outlets 40, 42, 44 operate selectively in various modes including a "DEF" mode in which the defrosting outlet 40 is selectively opened and closed by the defrosting damper 46, a "FOOT" mode in which the foot outlet 44 is selectively opened and closed by the foot damper 50, a "FOOT/DEF" mode in which the defrosting outlet 40 and the foot outlet 44 are selectively opened and closed by the defrosting damper 46 and the foot damper 50, a "VENT" mode (or "FACE" mode) in which the face outlet 42 is selectively opened and closed by the face damper 48, and a "B/L" mode in which the face outlet 42 and the foot outlet 44 are selectively opened and closed by the face damper 48 and the foot damper 50.

The evaporator 32 serves to evaporate a cooling medium flowing into the evaporator 32 and also to cool air which is introduced into the duct 14 by the air blower 30, through heat exchange between the air and the cooling medium. The cooling medium circuit 16 which includes the evaporator 32 includes a compressor 52 having an inlet port connected to an outlet port of the evaporator 32 by a cooling medium pipe 54a which has an accumulator 56. The compressor 52 compresses the cooling medium (gas coolant), drawn thereinto through the inlet port thereof, and it discharges a high-temperature, high-pressure cooling medium from an outlet port thereof into a cooling medium pipe 54b. The accumulator 56 separates the cooling medium into a liquid coolant and a gas coolant, and it supplies only the gas coolant to the compressor 52.

The cooling medium pipe 54b has an end portion branched into cooling medium pipes 55c, 54d, and the cooling medium pipe 54c is branched into cooling medium pipes 54e, 54f. The cooling medium pipe 54c has a first solenoid-operated valve 58, and the cooling medium pipe 54f has a second solenoid-operated valve 60. The cooling medium pipe 54f is connected to the cooling medium pipe 54a. The cooling medium pipe 54e has an exterior heat exchanger 62 which serves to evaporate a low-temperature, low-pressure cooling medium in a gas-liquid phase through heat exchange between the cooling medium and exterior air applied by an exterior fan 64 when the automatic air-conditioning system 12 operates in a heating mode to heat the passenger's compartment, and also to condense a high-temperature, high-pressure gas coolant into a liquid through heat exchange between the gas coolant and exterior air applied by the exterior fan 64 when the automatic air-conditioning system 12 operates in a cooling mode to cool the passenger's compartment.

The cooling medium pipe 54d has a first capillary tube 68 to be used for heating. The cooling medium pipes 54d, 54e are joined into a cooling medium pipe 54g which is connected to the inlet port of the evaporator 32. In the cooling medium pipe 54g, a third solenoid-operated valve 66 and a second capillary tube 70 used for cooling are provided in parallel to each other.

The heating medium circuit 18 includes a hot-water circulation pipe 72 for circulating and supplying hot water to the heater core 34, the hot-water circulation pipe 72 having a water pump 74 and a fuel-combustion heater 76 for generating heat by combusting a fuel. The fuel-combustion heater 76 is controlled in three modes, i.e., an igniting mode, a combustion ability switching mode (mode of normal heating operation), and an extinguishing mode. The hot-water circulation pipe 72 includes an outer conduit 78 disposed around and extending a certain length along a portion of the cooling medium pipe 54b of the cooling medium circuit 16. The cooling medium pipe 54b and the outer conduit 78 jointly provide a double-walled medium heat exchanger 80. When the high-temperature, high-pressure cooling medium discharged from the compressor 52 flows through the cooling medium pipe 54b, the medium heat exchanger 80 heats hot water flowing as a heating medium in the outer conduit 78 of the hot-water circulation pipe 72 through heat exchange between the heating medium and the cooling medium from the compressor 52.

To the automatic air-conditioning ECU 22, there are connected a vehicle ECU 82, a compressor inverter 84, a fuel-combustion heater ECU 86, a defrosting electric heater 88, an environmental condition detector 90, and an operating condition detector 92. The vehicle ECU 82 and the compressor inverter 84 are supplied with electric energy from a battery 94, and the compressor inverter 84 is connected to the compressor 52.

The environmental condition detector 90 includes an ambient air temperature sensor 96 for detecting an ambient air temperature $T_{AM}$, a passenger's compartment temperature sensor 98 for detecting a passenger's compartment temperature $T_R$, and a sunlight intensity sensor 100 for detecting a sunlight intensity $T_S$ (kcal/h.m$^2$). The operating condition detector 92 includes a water temperature sensor 102 for detecting the temperature of hot water flowing through the heater core 34, an air temperature sensor 104 for detecting the temperature of air discharged from the evaporator 32, a pressure sensor 106 for detecting the pressure of the cooling medium discharged from the compressor 52, a current sensor 108 for detecting a current from the battery 94, and a cooling medium temperature sensor 110 for detecting the temperature of the cooling medium near the exterior heat exchanger 62.

The automatic air-conditioning ECU 22 can perform a function as a calculating means for calculating a target discharged-air temperature $T_{AO}$ based on inputted environmental conditions including the passenger's compartment temperature $T_R$ and ambient air temperature $T_{AM}$, and a desired temperature setting $T_{SET}$, a function as an operation mode selecting means for selecting one of operation modes including a cooling mode, an air blowing mode, and a heating mode based on the target discharged-air temperature $T_{AO}$, and a function as a temperature control means for calculating an estimated discharged-air temperature SD in the selected operation mode to perform air-mixing control for cold air and hot air by means of the air-mixing unit 20 only when the estimated discharged-air temperature SD is not lower than a reference temperature setting.

Operation of the automatic air-conditioning system 12 provided with the discharged-air temperature control apparatus 10 constructed as described above will be described below.

The states of various components of the cooling medium circuit 16 when the automatic air-conditioning system 12 is in a cooling mode, a heating mode, a dehumidifying mode, and an air blowing mode respectively are shown in Table 1 given below.

TABLE 1

| Mode of operation | Cooling | Heating | Dehumi-difying | Air blowing |
|---|---|---|---|---|
| Solenoid-operated valve 58 | Open | Closed | Closed | Closed |
| Solenoid-operated valve 60 | Closed | Open | Closed | Closed |
| Solenoid-operated valve 66 | Closed | Closed | Open | Closed |
| Capillary tube 68 | — | Through | Through | — |
| Exterior heat exchanger 62 | Through | Through | — | — |
| Capillary tube 70 | Through | — | — | — |
| Evaporator 32 | Through | — | Through | — |

Figure 2:
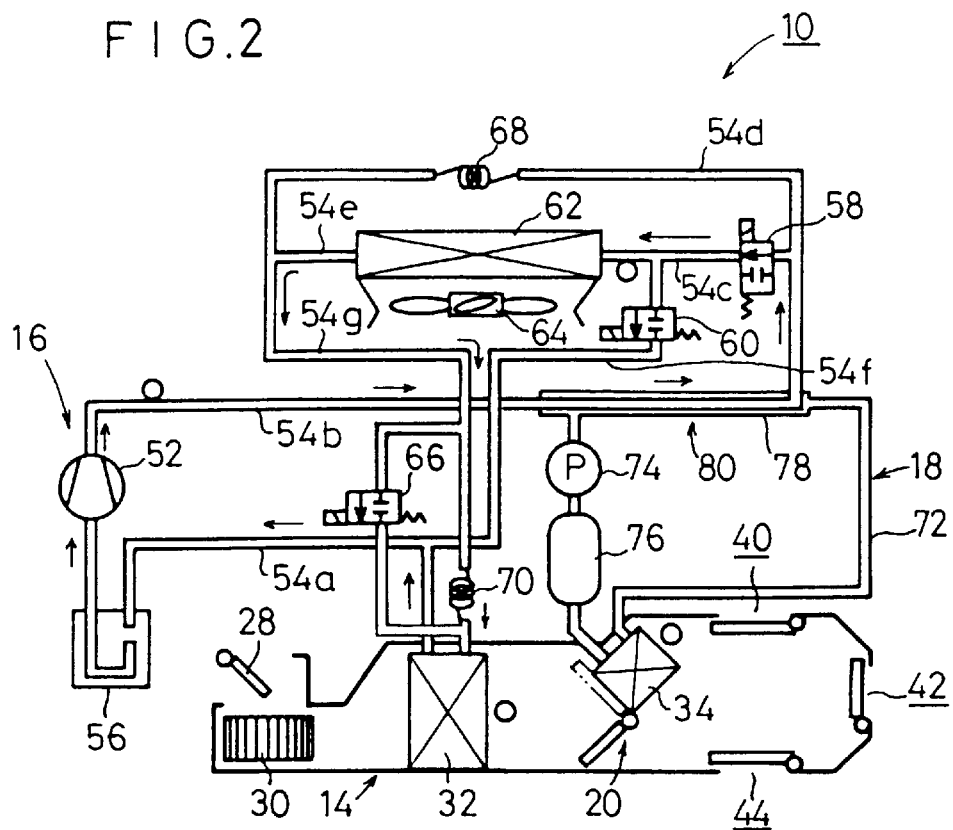
FIG. 2 is a schematic view illustrative of a cooling mode of the automatic air-conditioning system.

In the cooling mode, as shown in Table 1 and FIG. 2, the first solenoid-operated valve 58 is open and the second and third solenoid-operated valves 60, 66 are closed. Therefore, the cooling medium discharged from the compressor 52 flows through the cooling medium pipes 54b, 55c, the first solenoid-operated valve 58, the exterior heat exchanger 62, and the cooling medium pipe 54b into the second capillary tube 70, and then it flows through the evaporator 32 into the cooling medium pipe 54a, from which the cooling medium flows through the accumulator 56 back to the compressor 52.

Therefore, the high-temperature, high-pressure gas coolant discharged from the compressor 52 is turned to a liquid when the heat thereof is radiated by the exterior heat exchanger 62. The liquid coolant then flows through the second capillary tube 70 in which its pressure is reduced to produce a cooling medium in a gas-liquid phase. This cooling medium is evaporated in the evaporator 32 thereby to cool air that passes through the evaporator 32.

Figure 3:
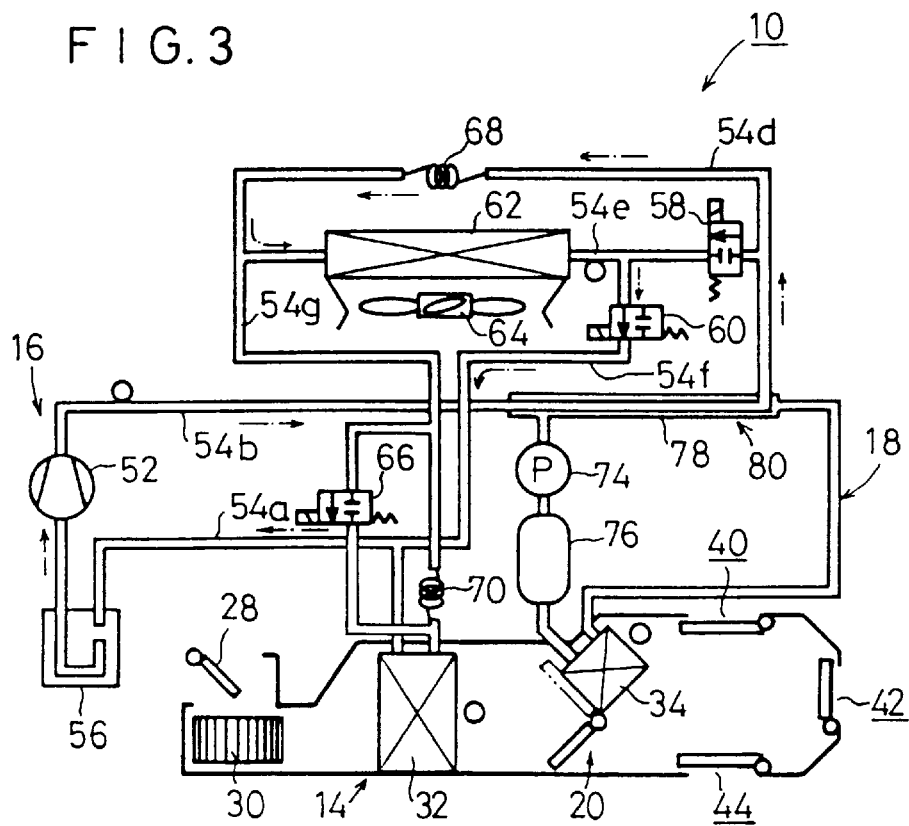
FIG. 3 is a schematic view illustrative of a heating mode of the automatic air-conditioning system.

In the heating mode, as shown in Table 1 and FIG. 3, the first and third solenoid-operated valves 58, 66 are closed, and the second solenoid-operated valve 60 is open. Therefore, the cooling medium discharged from the compressor 52 flows through the cooling medium pipes 54b, 54d into the first capillary tube 68 in which its pressure is reduced to produce a cooling medium in a gas-liquid phase. The cooling medium passes through the exterior heat exchanger 62 and is evaporated, after which the cooling medium passes through the second solenoid-operated valve 60 and the cooling medium pipes 54f, 54a into the accumulator 56, from which the cooling medium flows back to the compressor 52.

In the heating medium circuit 18, the outer conduit 78 of the double-walled medium heat exchanger 80 is supplied with hot water. Consequently, when the high-temperature, high-pressure cooling medium flows through the cooling medium pipe 54b internally with respect to the outer conduit 78, it heats the hot water in the outer conduit 78. The heated hot water, which is heated to a certain temperature by optionally actuating the fuel-combustion heater 76, is introduced by the water pump 74 into the heater core 34 for thereby heating air that passes through the heater core 34 to a certain temperature.

Figure 4:
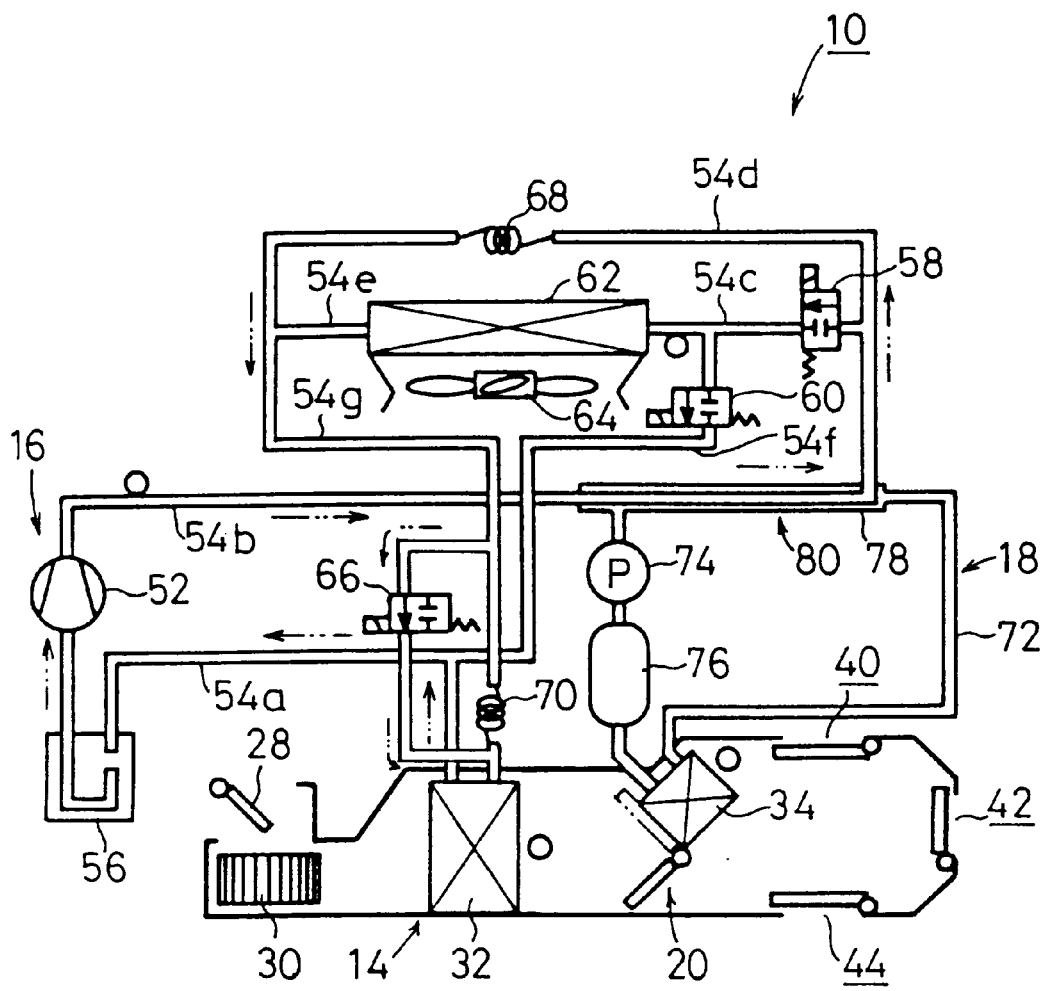
FIG. 4 is a schematic view illustrative of a dehumidifying mode of the automatic air-conditioning system.

In the dehumidifying mode, as shown in Table 1 and FIG. 4, the first and second solenoid-operated valves 58, 60 are closed, and the third solenoid-operated valve 66 is open. Therefore, the cooling medium discharged from the compressor 52 flows through the cooling medium pipes 54b, 54d, the first capillary tube 68, and the cooling medium pipe 54g into the third solenoid-operated valve 66. In the first capillary tube 68, the pressure of a cooling medium is reduced so that it is in a gas-liquid phase. The cooling medium then flows to the evaporator 32, it dehumidifies air that passes through the evaporator 32, and thereafter it flows from the cooling medium pipe 54a through the accumulator 56 back to the compressor 52.

In the air blowing mode, the first, second, and third solenoid-operated valves 58, 60, 66 are closed, and the water pump 74 is turned off, as shown in FIG. 1.

Figure 5:
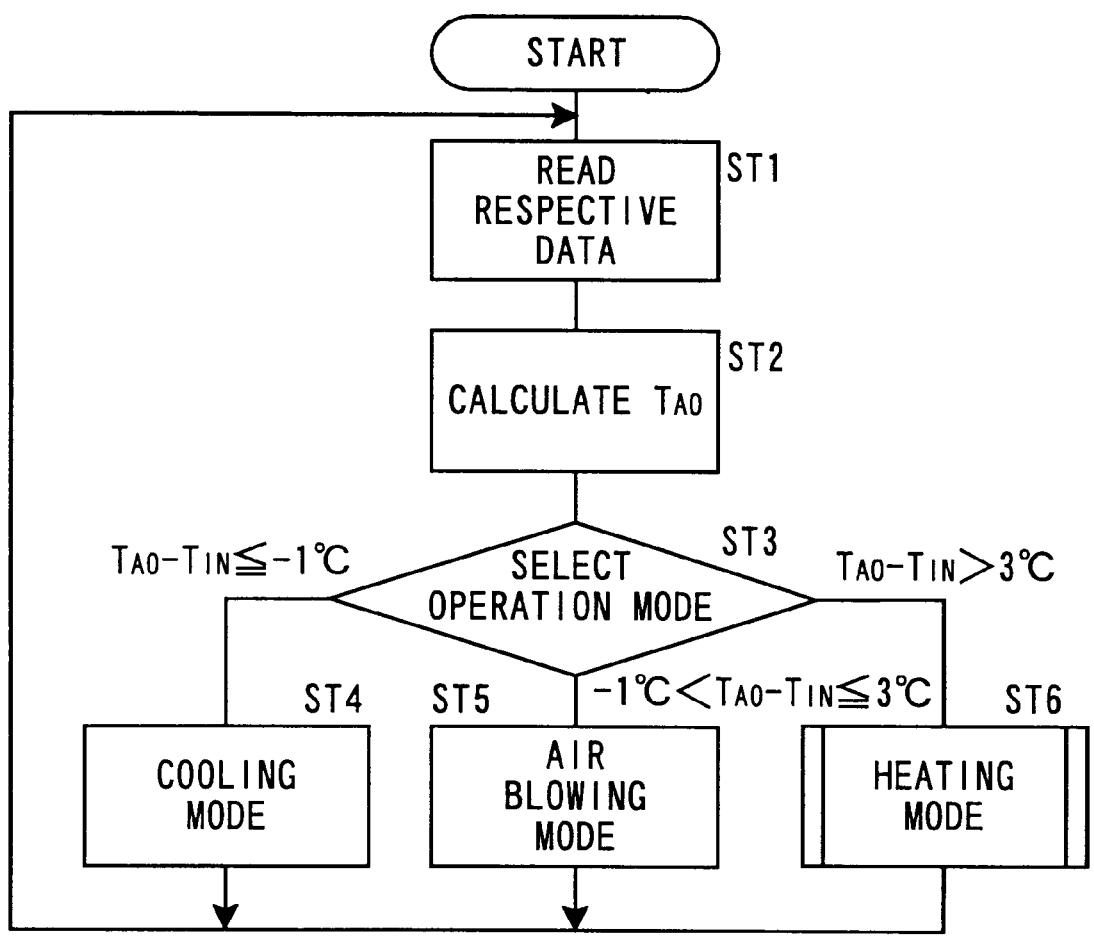
FIG. 5 is a flow chart illustrative of a method for controlling discharged-air temperature according to the present invention.

The discharged-air temperature control method for the vehicular air-conditioning system according to the present invention will be described below with reference to a flow chart shown in FIG. 5.

The automatic air-conditioning ECU 22 reads signals from the ambient air temperature sensor 96, the passenger's compartment temperature sensor 98, and the sunlight intensity sensor 100 of the environmental condition detector 90 and also signals from the water temperature sensor 102, the air temperature sensor 104, the pressure sensor 106, the current sensor 108, and the cooling medium temperature sensor 110 of the operating condition detector 92. The automatic air-conditioning ECU 22 also reads a desired temperature setting $T_{SET}$ which has been entered, for example, manually by the passenger (step ST1).

Subsequently, the routine proceeds to a step ST2. Based on the desired temperature setting $T_{SET}$ read by the automatic air-conditioning ECU, and the parameters detected by the environmental condition detector 90, i.e., the ambient air temperature $T_{AM}$ detected by the ambient air temperature sensor 96, the passenger's compartment temperature $T_R$ detected by the passenger's compartment temperature sensor 98, and the sunlight intensity $T_S$ detected by the sunlight intensity sensor 100, the automatic air-conditioning ECU 22 calculates a target discharged-air temperature $T_{AO}$ for the air to be discharged into the passenger's compartment according to the following equation (1):

$$T_{AO} = K_{SET} \times T_{SET} - K_R \times T_R - K_{AM} \times T_{AM} - K_S \times T_S - C \tag{1}$$

where $K_{SET}$, $K_R$, $K_{AM}$, $K_S$ represent coefficients (gains) and C a constant.

Figure 6:
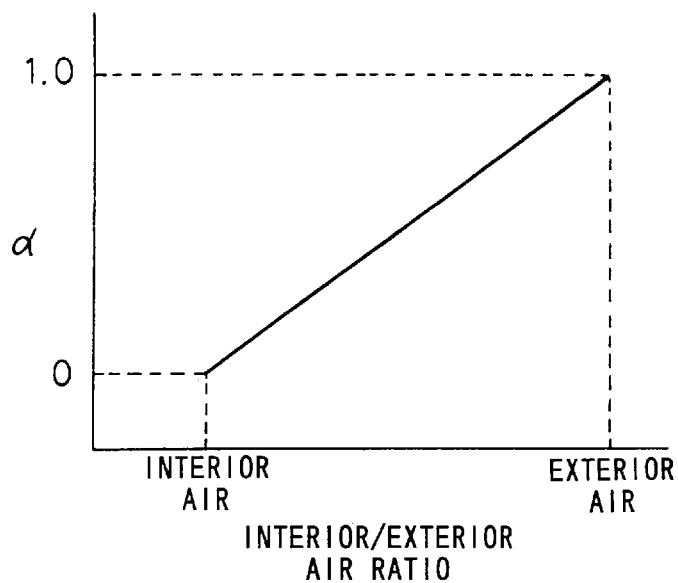
FIG. 6 is a graph illustrative of a relationship between a and the ratio of interior air and exterior air, referred to when a calculated value of intake air temperature is computed.

The operation mode is selected on the basis of a difference between the target discharged-air temperature $T_{AO}$ calculated in accordance with the equation (1) and the calculated value of intake air temperature $T_{IN}$ introduced from the interior air inlet 24 or the exterior air inlet 26 (step ST3). The calculated value of intake air temperature $T_{IN}$ is determined from the following equation (2). In the equation (2), $\alpha$ is set from the ratio between the interior air and the exterior air as shown in FIG. 6.

$$T_{IN} = \alpha \times T_{AM} + (1-\alpha) \times T_R \tag{2}$$

Figure 7:
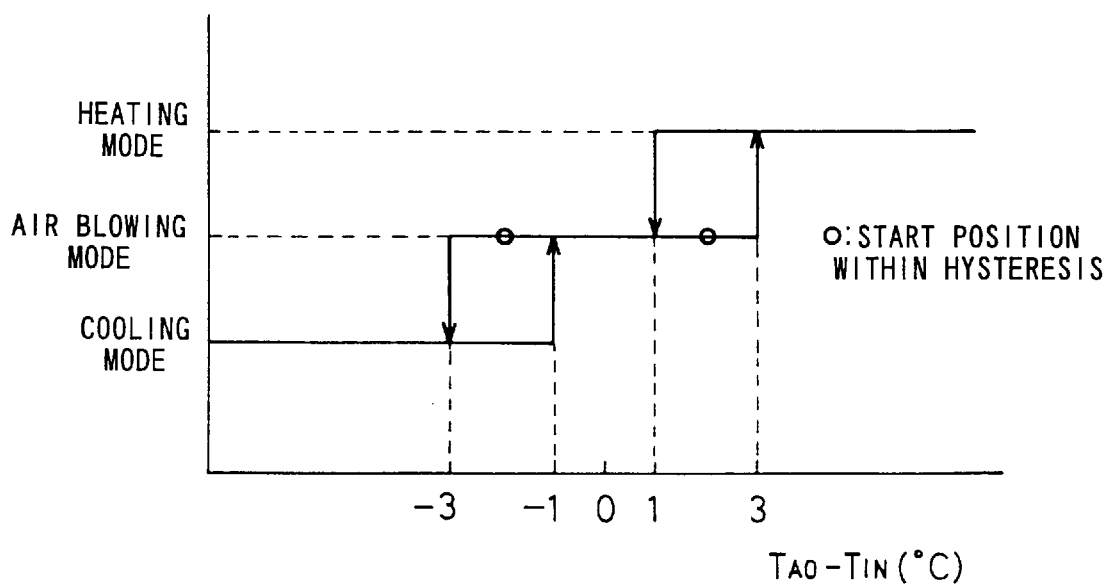
FIG. 7 is a map referred to when the operation mode is set.

As shown in FIG. 7, the operation mode is selected from the cooling mode, the air blowing mode, and the heating mode depending on the value of $T_{AO} - T_{IN}$. When the initial condition is within the hysteresis, the air blowing mode indicated by open circles in FIG. 7 is selected. Accordingly, the routine selectively proceeds to one of the step ST4 to the step ST6.

Figure 8:
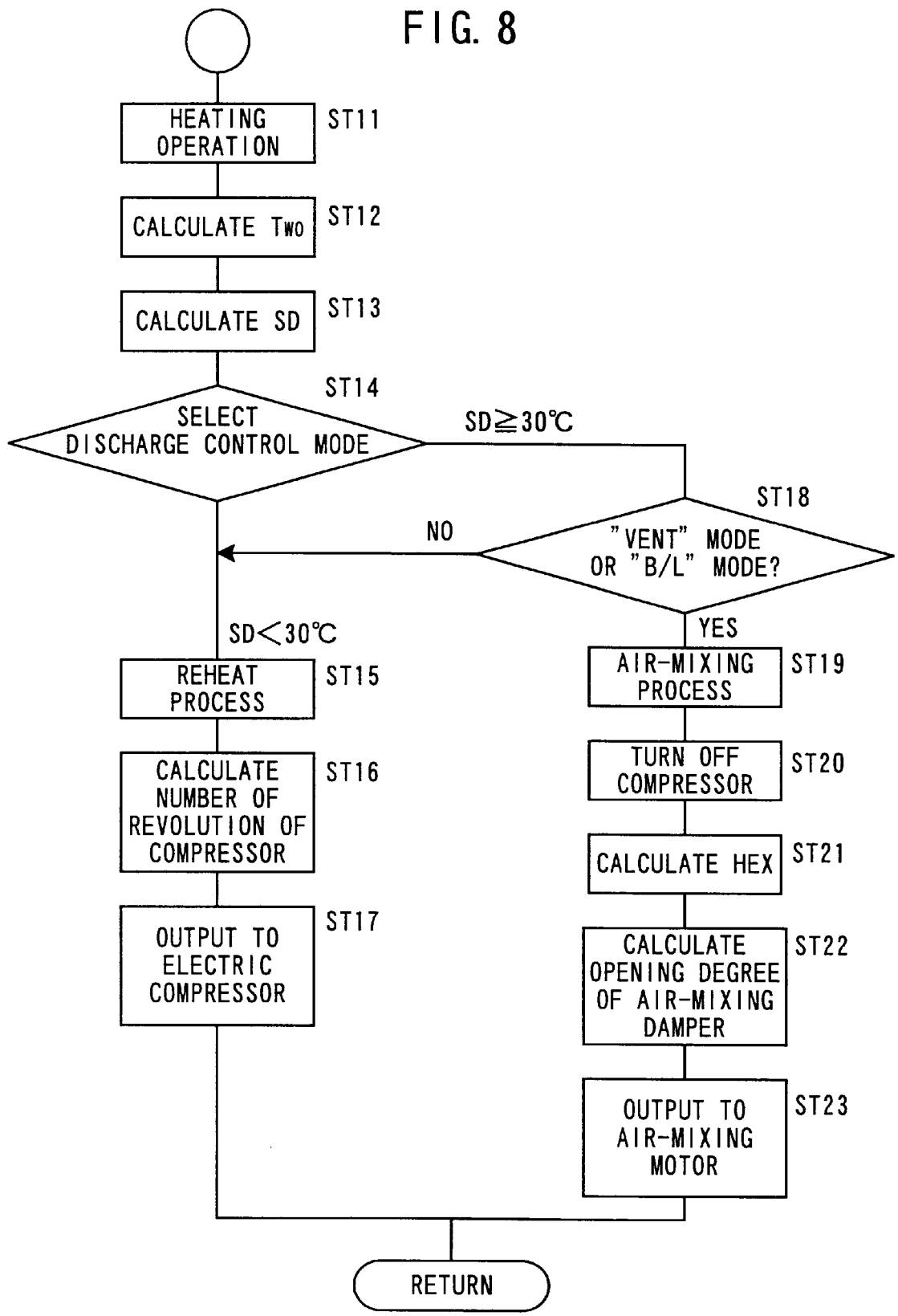
FIG. 8 is a flowchart illustrative of a subroutine for the heating operation shown in FIG. 5.

If the heating mode operation is selected in the step ST3 (step ST6), the routine proceeds to a subroutine for the heating operation shown in FIG. 8. That is, if the heating mode operation is selected (step ST11), the subroutine proceeds to a step ST12 to calculate the target water temperature $T_{WO}$ of the heater core 34. The target water temperature $T_{WO}$ is calculated in accordance with the following equation (3). In the equation (3), $\phi$ represents the temperature efficiency which is set from the airflow amount of the air blower 30 as shown in FIG. 9.

$$T_{WO} = (T_{AO} - T_{IN})/\phi + T_{IN} \tag{3}$$

Further, the subroutine proceeds to a step ST13 to calculate the estimated discharged-air temperature (SD) in accordance with the following equation (4).

$$SD = \phi \times (T_W - T_E) + T_E \tag{4}$$

In the equation (4), $\phi$ is set in accordance with FIG. 9 in the same manner as in the equation (3). The estimated discharged-air temperature SD is calculated on the basis of the actual water temperature $T_W$ of the hot water flowing through the heater core 34 detected by the water temperature sensor 102, and the actual air temperature $T_E$ on the discharge side of the evaporator 32 detected by the air temperature sensor 104.

The subroutine proceeds to a step ST14 to select the discharge control mode. As shown in FIG. 10, when the discharge control mode is selected, if the estimated discharged-air temperature SD is not lower than the reference temperature setting, for example, not lower than 30° C., the air-mixing control is "necessary".

If the estimated discharged-air temperature SD is lower than 30° C., the subroutine proceeds to a step ST15 to perform the heating operation based on the reheat process. That is, the rotation speed of the compressor 52 is calculated on the basis of the target water temperature $T_{WO}$ (step ST16) in a state in which the air-mixing damper 36 of the air-mixing unit 20 is disposed at the position of 100% of opening degree in FIG. 1 (see solid line). Subsequently, an output is given from the compressor inverter 84 to the compressor 52 (step ST17) to perform the heating operation based on the reheat process.

On the other hand, if the estimated discharged-air temperature SD is not lower than 30° C., the subroutine proceeds to a step ST18 to judge whether the outlet mode is the "VENT" mode or the "B/L" mode. If the outlet mode does not involves the discharge from the face outlet 42 (NO in the step ST18), the subroutine proceeds to the step ST15 to perform the heating operation based on the reheat process.

If the outlet mode is the "VENT" mode or the "B/L" mode (YES in the step ST18), the subroutine proceeds to a step ST19 to perform the air-mixing control. Specifically, the compressor 52 is turned off by the aid of the compressor inverter 84 (step ST20), and then the subroutine proceeds to a step ST21 to calculate the required heat exchanger effectiveness $H_{EX}$ in accordance with the following equation (5).

$$HEX\ (\%) = (T_{AO} - T_E)/(T_W - T_E) \times 100 \tag{5}$$

Figure 11:
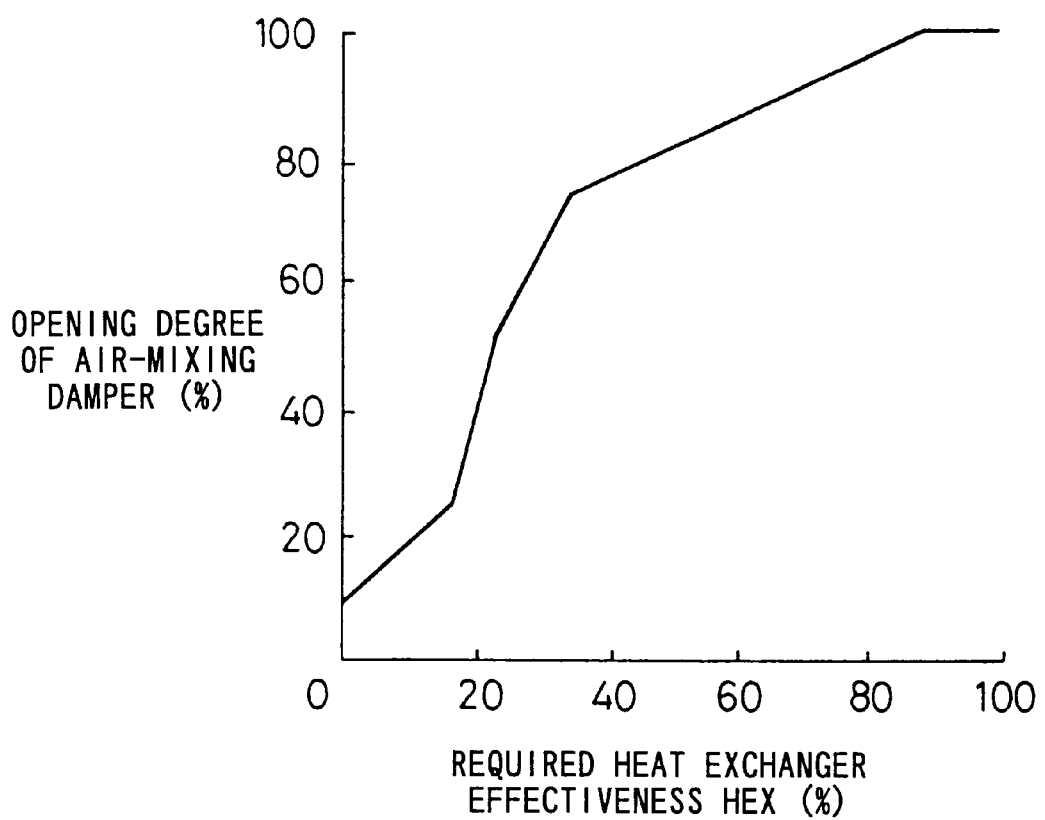
FIG. 11 is a map illustrative of the opening degree or angular extent of an air-mixing damper.

Subsequently, the opening degree of the air-mixing damper is determined from an air-mixing map shown in FIG. 11, on the basis of the calculated required heat exchanger effectiveness Ha (step ST22). The air-mixing motor 38 is actuated on the basis of the calculated opening degree of the air-mixing damper, and the air-mixing damper 36 is disposed at a predetermined position corresponding to the opening degree (step ST23). Accordingly, the air, which has passed through the evaporator 32, is subjected to adjustment for the airflow amount to pass through the heater core 34 for being heated thereby and the airflow amount to make the detour to avoid the heater core 34. The two airflows are mixed with each other, followed by being discharged from at least the face outlet 42 into the passenger's compartment.

Figure 12:
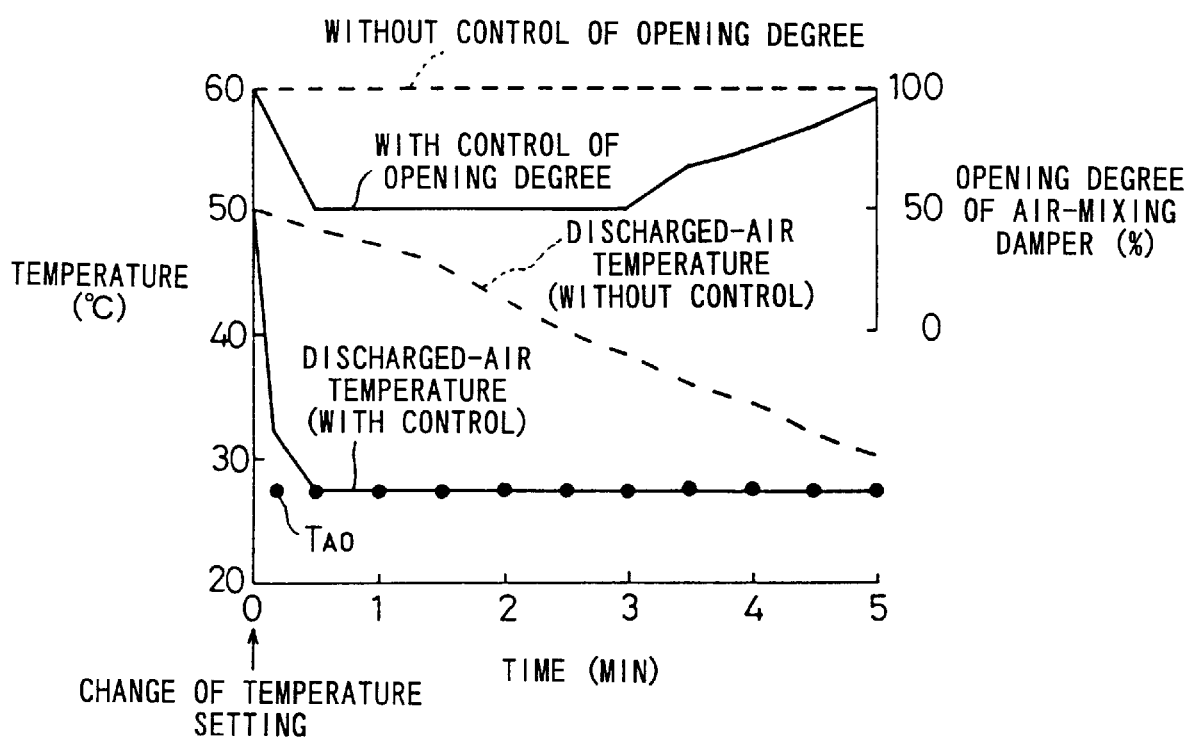
FIG. 12 is a graph illustrative of the discharged-air temperature as changed depending on whether the control on the opening degree of the air-mixing damper is exerted or not exerted.

In the embodiment of the present invention, for example, as shown by a solid line in FIG. 12, when the target discharged-air temperature $T_{AO}$ is changed to 28° C., and the operation mode is switched from the "HEAT" mode to the "VENT" mode, then the opening degree of the air-mixing damper is changed. Accordingly, the temperature of air discharged from the face outlet 42 is immediately adjusted toward the target discharged-air temperature $T_{AO}$. Thus, the system follows the discharged-air temperature in an extremely well-suited manner.

On the other hand, if the opening degree of the air-mixing damper is not controlled, the discharged-air temperature gradually changes as shown by a broken line in FIG. 12. Consequently, high temperature air is discharged from the face outlet 42 against the face of the passenger.

Therefore, the system of the embodiment of the present invention follows the change in discharged-air temperature i.e., the change in target discharged-air temperature $T_{AO}$, in an extremely well-suited manner, when the desired temperature setting is changed. The present invention is effective in that no high temperature air is discharged from the face outlet 42 against the face of the passenger, and it is possible to perform the air-conditioning control in an extremely comfortable manner.

Especially, in the embodiment of the present invention, when the estimated discharged-air temperature SD, which is calculated on the basis of the actual air temperature $T_E$ passed through the evaporator 32 and the actual water temperature $T_W$ in the heater core 34, is not lower than the reference temperature setting (for example, not lower than 30° C.), the air-mixing control for cold air and hot air is always performed by actuating the air-mixing unit 20. Accordingly, the temperature of air discharged from the face outlet 42 can be actually adjusted to be not higher than the predetermined temperature quickly and reliably. The system effectively follows any sudden change in temperature setting, making it possible to prevent the face of the passenger from high temperature air which would be otherwise discharged thereagainst. In the embodiment of the present invention, explanation has been made for the air-mixing control in the heating operation. However, the air-mixing control is performed in the same manner as described above when the operation is changed from the heating operation to the air blowing operation.

As described above, according to the method and the apparatus for controlling the discharged-air temperature for the vehicular air-conditioning system concerning the present invention, the estimated discharged-air temperature is calculated in the operation mode, for example, in the heating mode selected on the basis of the target discharged-air temperature. Only when the estimated discharged-air temperature is not lower than the reference temperature setting, the air-mixing control is performed for cold air and hot air to adjust the temperature of air discharged from the upper outlet. Accordingly, the air, which is discharged against the face of the passenger, can be always maintained at a temperature not higher than the predetermined temperature. It is possible to reliably eliminate the uncomfortable sensation which would be otherwise given to the passenger due to discharge of high temperature air. Therefore, the system of the present invention quickly follows any sudden change in temperature setting, making it possible to effectively perform the comfortable air-conditioning control.

What is claimed is:

1. A method for controlling discharged-air temperature for a vehicular air-conditioning system including an upper outlet disposed at an upper position for discharging air into a passenger's compartment and a lower outlet disposed at a lower position for discharging air into said passenger's compartment, said method comprising the steps of:

inputting a desired temperature setting together with environmental conditions including an interior air temperature and an exterior air temperature;

calculating a target discharged-air temperature on the basis of said environmental conditions and said desired temperature setting;

selecting one of operation modes including a cooling operation mode, an air blowing operation mode, and a heating operation mode, on the basis of said calculated target discharged-air temperature;

calculating an estimated discharged air temperature in said selected operation mode;

judging whether or not said estimated discharged-air temperature is not lower than a reference temperature setting; and performing air-mixing control to adjust temperature of air discharged from said upper outlet only when said estimated discharged-air temperature is not lower than said reference temperature setting.

2. The method according to claim 1, wherein said air-mixing control is performed only when said operation mode is said heating mode or said operation mode is changed from said heating mode to said air blowing mode, and an outlet mode is a vent mode or a bi-level mode.

3. An apparatus for controlling discharged-air temperature for a vehicular air-conditioning system, comprising:

a duct including an upper outlet disposed at an upper position for discharging air into a passenger's compartment and a lower outlet disposed at a lower position for discharging air into said passenger's compartment;

a cooling medium circuit for cooling air by means of heat exchange effected between a cooling medium and said air flowing through said duct;

a heating medium circuit for heating air by means of heat exchange effected between a heating medium and said air flowing through said duct;

an air-mixing unit disposed in said duct, for adjusting a ratio between an airflow amount which makes a passage through said heating medium circuit and an airflow amount which makes a detour to avoid said heating medium circuit;

a calculating unit for calculating a target discharged-air temperature on the basis of a desired temperature setting and inputted environmental conditions including an interior air temperature and an exterior air temperature;

an operation mode selecting unit for selecting one of operation modes including a cooling operation mode, an air blowing operation mode, and a heating operation mode, on the basis of said target discharged-air temperature; and a temperature control unit for calculating an estimated discharged-air temperature in said selected operation mode, and performing air-mixing control for cold air and hot air by means of said air-mixing unit to adjust temperature of air discharged from said upper outlet only when said estimated discharged-air temperature is not lower than a reference temperature setting.

4. The apparatus according to claim 3, wherein said calculating unit, operation mode selecting unit and temperature control unit comprise an automatic air-conditioning ECU.

5. The apparatus according to claim 3, wherein said temperature control unit performs said air-mixing control only when said operation mode is said heating mode or said operation mode is changed from said heating mode to said air blowing mode, and an outlet mode is a vent mode or a bi-level mode.

6. The apparatus according to claim 3, wherein said cooling medium circuit comprises:

a first interior heat exchanger disposed in said duct; and a compressor for circulating said cooling medium to said first interior heat exchanger; and said heating medium circuit comprises:

a second interior heat exchanger disposed in said duct; and a medium heat exchanger for heating said heating medium by means of heat exchange effected between said heating medium and said cooling medium flowing through said cooling medium circuit at a temperature higher than that of said heating medium.

7. The apparatus according to claim 6, wherein said heating medium circuit comprises a fuel-combustion heater for heating hot water which is used as said heating medium.

* * * * *